United States Patent
Chen

(10) Patent No.: US 8,737,423 B2
(45) Date of Patent: May 27, 2014

(54) METHOD FOR PRE-EMPTING DATA TRANSMISSION IN A DISCOVERY CHANNEL

(75) Inventor: Richard Chen, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 392 days.

(21) Appl. No.: 12/937,004

(22) PCT Filed: Apr. 7, 2009

(86) PCT No.: PCT/IB2009/051460
§ 371 (c)(1),
(2), (4) Date: Oct. 8, 2010

(87) PCT Pub. No.: WO2009/125344
PCT Pub. Date: Oct. 15, 2009

(65) Prior Publication Data
US 2011/0026465 A1 Feb. 3, 2011

Related U.S. Application Data

(60) Provisional application No. 61/043,464, filed on Apr. 9, 2008, provisional application No. 61/160,375, filed on Mar. 16, 2009.

(51) Int. Cl.
*H04L 12/42* (2006.01)
*H04L 12/403* (2006.01)
(52) U.S. Cl.
USPC .......................... 370/447; 370/461; 370/462
(58) Field of Classification Search
USPC ......... 370/328, 329, 445, 447, 461–462, 470, 370/476
See application file for complete search history.

(56) References Cited

U.S. PATENT DOCUMENTS

| 7,610,018 | B2 * | 10/2009 | Marin et al. | 455/63.3 |
| 7,817,612 | B2 * | 10/2010 | Morioka | 370/341 |
| 2002/0152324 | A1 * | 10/2002 | Sherman | 709/245 |
| 2005/0249167 | A1 * | 11/2005 | Salokannel | 370/336 |
| 2007/0291636 | A1 * | 12/2007 | Rajagopal et al. | 370/208 |
| 2011/0026465 | A1 * | 2/2011 | Chen | 370/328 |

FOREIGN PATENT DOCUMENTS

EP 1624627 A1 8/2006

OTHER PUBLICATIONS

ECMA International: "Standard ECMA-387 High Rate 60GHz PHY, MAC and HDMI PAL", 1st edition [Onl1ne] Dec. 2008, pp. 166-252, XP002541019, Geneva, Retrieved from the Internet: URL:http://www.ecma-international.org/publications/standards/Ecma-387.htm>.
ECMA International: "Standard ECMA-368 High Rate Ultra Wideband PHY and MAC Standard", 1st edition Internet Citation, [Online] pp. 10-14, XP002484177, Retrieved from the Internet: URL : http ://www.ces.neu.edu/home/subli me/Ref_5.pdf>.

* cited by examiner

*Primary Examiner* — Benjamin H Elliott, IV
(74) *Attorney, Agent, or Firm* — Larry Liberchuk

(57) ABSTRACT

A method (300) for pre-empting data transmissions in a discovery channel. The method comprises scanning the discovery channel to detect at least one data beacon transmitted in beacon slots (230) of a superframe (S310); determining if at least one data beacon was detected (S320); and transmitting a pre-empt beacon if the at least one data beacon was detected (S330).

14 Claims, 3 Drawing Sheets

METHOD FOR PRE-EMPTING DATA TRANSMISSION IN A DISCOVERY CHANNEL

This application claims the benefit of U.S. Provisional Application No. 61/043,464 filed on Apr. 9, 2008.

The invention generally relates to discovery of devices in wireless networks.

The 60 GHz is an unlicensed frequency band that can be utilized for high rate data transmissions. Communication standards have been developed to provide high rate wireless personal area network (WPAN) for transporting bulk data transfer and multimedia streaming over the 60 GHz frequency band. One of these communication standards is the Ecma International TC48 (hereinafter "Ecma").

FIG. 1 shows a diagram of a WPAN 100 operating in accordance with the Ecma standard. The WPAN 100 includes a number of N devices 110-1 through 110-N, where the range between the devices 110-X (where X is an integer equal to or greater than 1) is up to 10 meters. Three different types of devices can operate in the WPAN 100. A type-A device supports video streaming and WPAN applications in the 10-meter range with a steerable and trainable antenna. A type-B device offers video and data applications over shorter range (1-3 meters) point-to-point links with a non-trainable antenna. A type-C device supports only data applications over point-to-point links at a range less than 1 meter with a non-trainable antenna. Each device type transmits data at a different rate and uses a different physical mode. The physical mode defines a combination of a transmission mode (e.g., a single carrier block transmission (SCBT), a single carrier, OFDM, etc.) and a modulation mode (e.g., QAM, amplitude-shift-keying (ASK), BPSK, etc.).

A device 110-X sends beacons to all the neighboring devices to exchange coordination information, such as reservations of a channel time or a synchronization time. Beacons are transmitted using directional antennas to support simultaneous connections. Devices 110-X transmit beacons in unique beacon slots within a beacon period (BP) defined in a superframe. A superframe is a timing structure utilized in a distributed reservation protocol (DRP) based data transmission.

As shown in FIG. 2A, a superframe 200 starts with a beacon period 250 and ends with a data period 220. The superframe timing structure occurs periodically over time. The maximum length of the beacon period 250 is predefined according to the number of beacon slots 230. The length of each beacon slot is also preconfigured. Beacon slots 230 in a beacon period announced 240 are numbered in sequence, starting at zero. A number of M (where M is an integer greater than 1) initial beacon slots of a beacon period are referred to as signaling slots 210 and are used to extend the beacon period length of neighbors. Beacons sent in beacon slots 230 are referred to as data beacons, because these beacons are used for announcing the DRP based data transmission.

In the DRP based data transmission, an active device 110-X transmits a data beacon and listens to neighbor's beacons in all beacon slots 230 specified by the device's beacon period length in each superframe 200. When transmitting in a beacon slot 230, a device starts to transmit a frame over the wireless medium at the beginning of a beacon slot 230. A device 110-X transmits data beacons at a predefined rate according to the physical mode of the device 110-X.

The superframe 200 is typically transmitted by type-A and type-B devices. The type-C devices use a superframe structure 260 illustrated in FIG. 2B. The superframe 260 refers to a master-slave period and includes a period of time 262 for exchanging commands and a data time period 263 for exchanging data between a master device 110-X and a slave device 110-Y (where Y is an integer equal to or greater than 1). Since both devices 110-X and 110-Y are required to listen to the wireless medium during the time period 262, it is equivalent to a beacon period utilized for pre-empting. For the purpose of pre-empting, the first portions of the command exchange period 262 are considered as signaling slots 261.

The Ecma TC-48 standard defines a unique channel (hereinafter "the discovery channel") dedicated for discovery of devices. Data transactions using superframes and discovery beacons can be transmitted and coexist in the discovery channel. The discovery beacons are not part of the superframe (are not data beacons), but are rather utilized by devices to discover other devices in the WPAN 100. Discovery beacons access the discovery channel using a contention based medium access mechanism (CSMA/CA), in which a device 110-X first listens to the wireless medium, and if it is free, the device 110-X sends its discovery beacons.

As the discovery channel is dedicated for discovery of devices, the discovery beacons should take precedence over the DRP based transmission. However, in the DRP based transmission, a device 110-X does not require listening to the medium before sending data. Thus, the DRP based transmission gets a higher precedence.

Therefore, it would be advantageous to provide a robust pre-empting mechanism that allows a device to pre-empt existing data transmission and vacating the discovery channel before sending discovery beacons.

Certain embodiments of the invention include a method for pre-empting data transmissions in a discovery channel. The method comprises scanning the discovery channel to detect at least one data beacon transmitted in beacon slots of a superframe; determining if at least one data beacon was detected; and transmitting a pre-empt beacon if the at least one data beacon was detected.

Certain embodiments of the invention also include a computer readable medium having stored thereon computer executable code causing a processor to execute a process of pre-empting data transmissions in a discovery channel. The process comprises scanning the discovery channel to detect at least one data beacon transmitted in beacon slots of a superframe; determining if at least one data beacon was detected; and transmitting a pre-empt beacon if the at least one data beacon was detected.

Certain embodiments of the invention further include a device connected in a wireless personal area network (WPAN) and capable of pre-empting data transmissions in a discovery channel. The device comprises a receiver for scanning the discovery channel to detect at least one data beacon transmitted in beacon slots of a superframe; a determination unit for determining if at least one data beacon was detected; and a transmitter for transmitting a pre-empt beacon if the at least one data beacon was detected.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
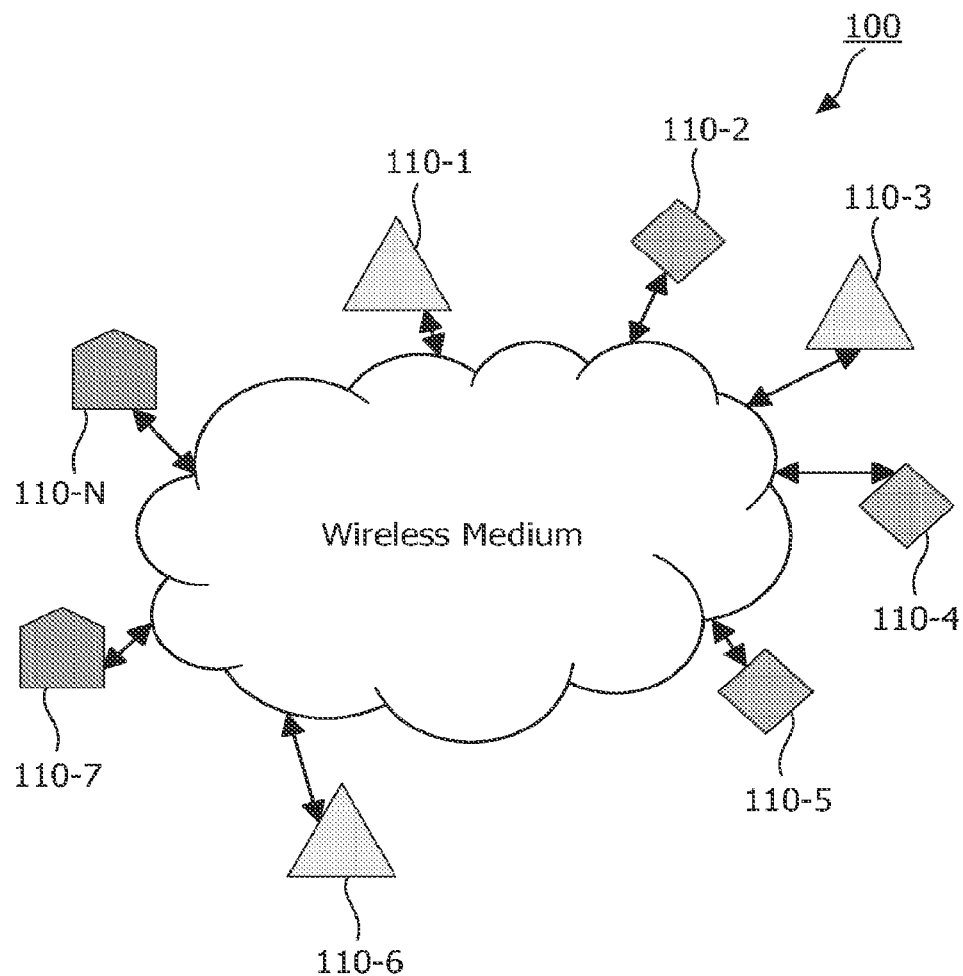
FIG. 1 is a schematic diagram of a WPAN.
Figure 2A:
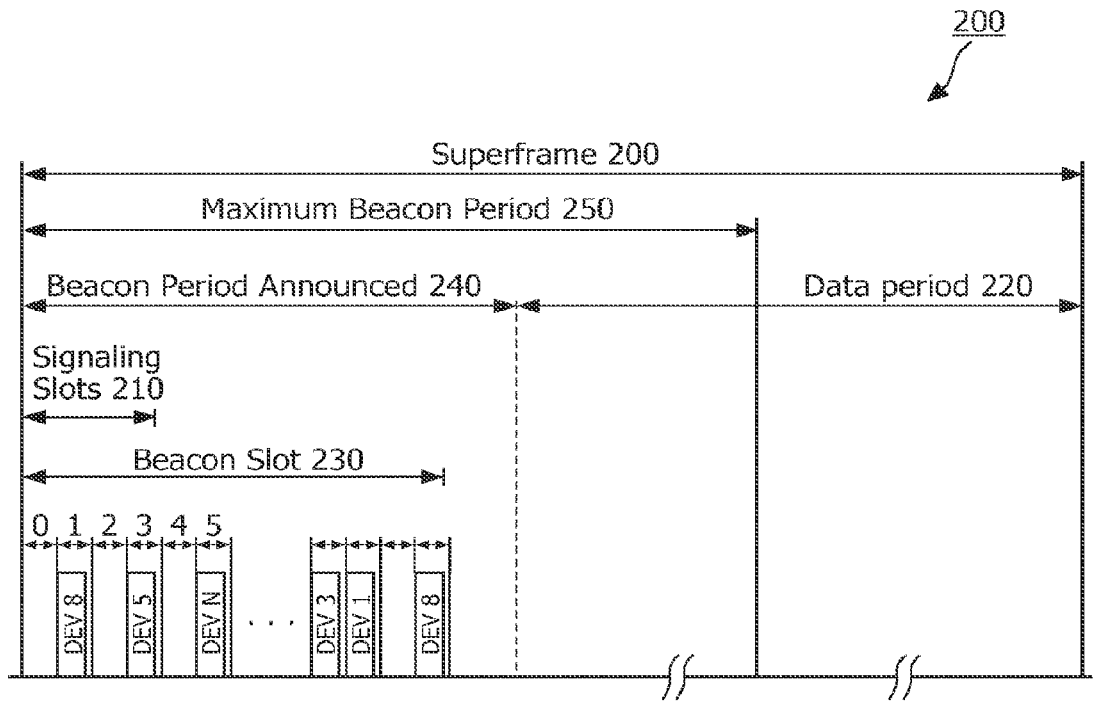
FIGS. 2A and 2B are schematic diagrams of superframes.
Figure 2B:
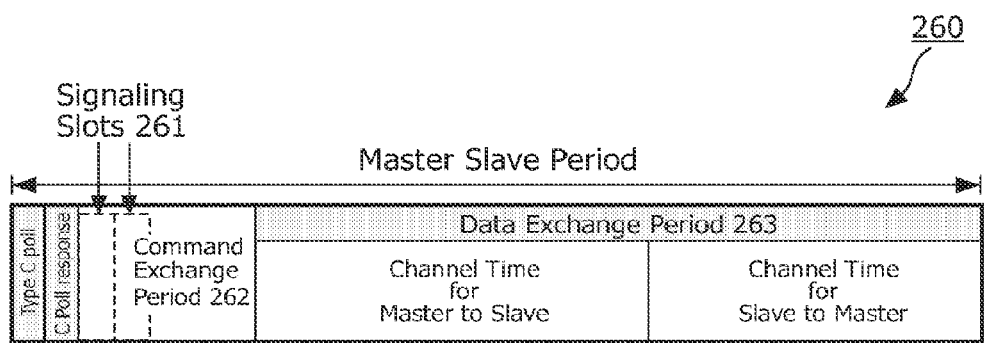

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention provide a robust mechanism to pre-empt existing data transmission in the discovery channel. The data is transmitted by the different types of devices 110-X using various physical modes (i.e., different transmission and modulation techniques). The physical modes are known a priori. Pre-emption of data transmissions in the discovery channel is essential before sending discovery beacons, as when data beacons and discovery beacons coexist in the discovery channel, data frames and data beacons take away transmission opportunities from discovery beacons due to the medium access mechanism "listen-before-talk". This may cause significant delays or failures in a device's discovery process.

Figure 3:
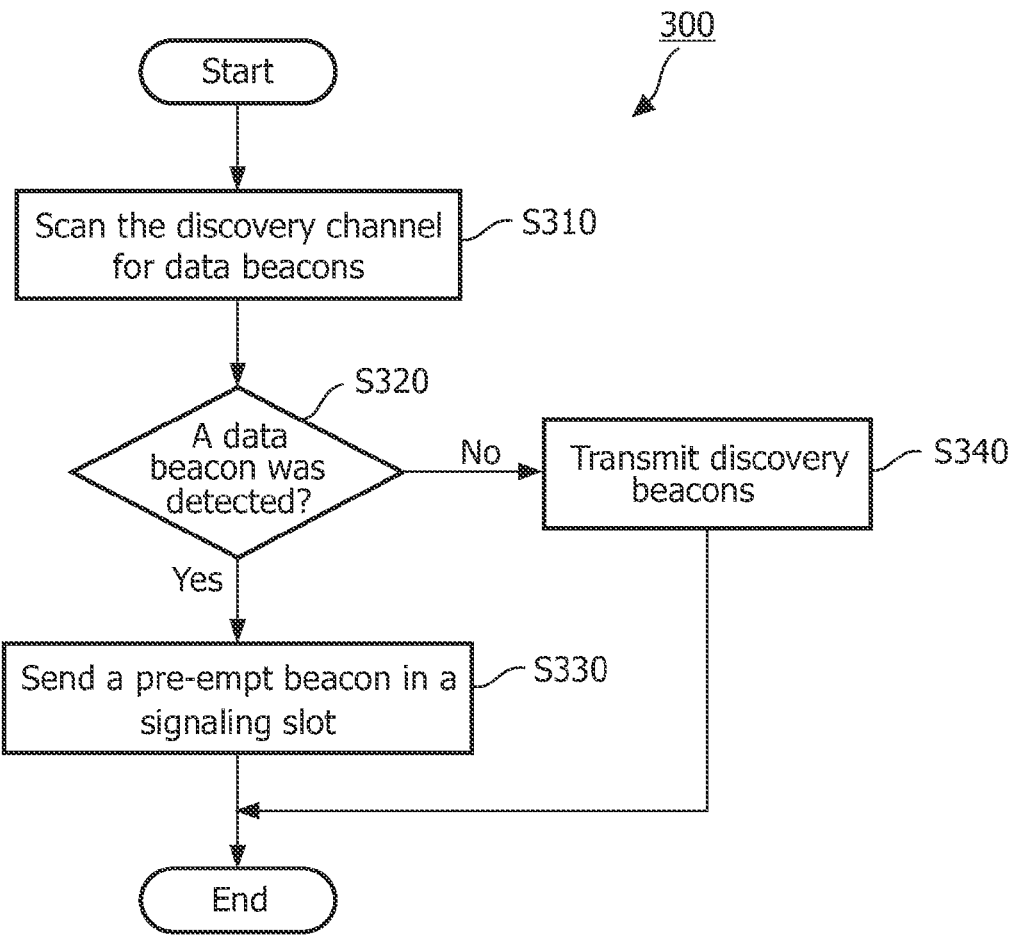
FIG. 3 is a flowchart describing the method for pre-empting data transmission in the discovery channel in accordance with an embodiment of the invention.

FIG. 3 shows an exemplary and non-limiting flowchart 300 describing a method for pre-empting data transmissions in the discovery channel as implemented in accordance with an embodiment of the invention. The method is performed by a device 110-X intending to send discovery beacons on the discovery channel. The type of the device 110-X may be a type A device, a type B device, and a type C device, each of which is described in greater detail above.

At S310 the device 110-X scans the channel to detect data beacons transmitted in beacon slots 230 of a superframe 200. The scanning is performed during at least one superframe, where the device 110-X tries to receive all types of data beacons, i.e., beacons that can be transmitted by all different types of devices 110-Y. In another embodiment, the device 110-X may try receiving a certain type of a data beacon at a time, i.e., during a superframe. At S320, a check is performed to determine if at least one data beacon is detected, and if no data beacons were detected execution proceeds to S340; otherwise, execution continues with S330. As mentioned above, data beacons include requests for DRP reservations for data transmissions. At S330, a pre-empt beacon is generated and sent in one of the signaling slots 210 or 261. The signaling slot in which the pre-empt beacon is transmitted is randomly chosen among the signaling slots that are indicated by the received data beacon. In another embodiment, the pre-empt beacon is transmitted in one of the beacon slots 230 during a beacon period 240 announced by a received data beacon. The signaling slots 210 are the slots that all devices 110-Y listen to during their respective beacon periods. A device 110-Y receiving the pre-empt beacon suspends its data transmission in the discovery channel.

At S340 the device 110-X transmits discovery beacons over the discovery channel using a contention based medium access. In accordance with one embodiment of the invention, prior to transmitting the discovery beacons, the device 110-X senses the channel to determine if there is an ongoing discovery beacon transmission.

Figure 4:
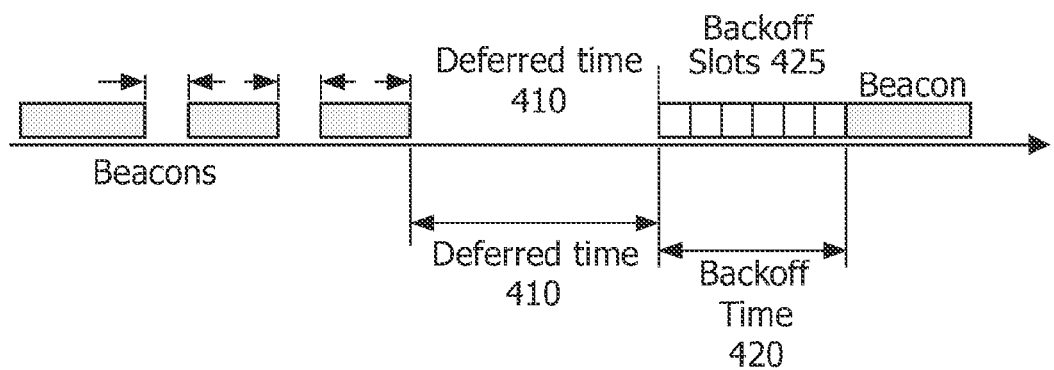
FIG. 4 is a diagram illustrating the discovery beacon transmission in the discovery channel in accordance with an embodiment of the invention.

As illustrated in FIG. 4, if a discovery beacon transmission is detected, the device 110-X defers for a time period 410 after the detected beacon transmission is completed. The device 110-X then computes a random backoff time 420 for an additional deferral time before transmitting the beacons. The backoff time may be computed as follows:

$$\text{backoff time} = \text{aSlotTime} * RI$$

where RI is a number randomly drawn from a uniform distribution over a predefined time interval, and aSlotTime is a duration of a backoff slot 425. All backoff slots 425 occur after the deferred time period 410 during which the medium is determined to be idle. If no transmission is detected for the duration of a particular backoff slot, then a value of a backoff timer counting the backoff time is decremented by aSlotTime value. If any transmission is detected at any time during a backoff slot, then the backoff timer is not changed. Transmission of discovery beacons begins when the backoff timer reaches zero.

After transmitting a discovery beacon, a device 110-X schedules the transmission of the same discovery beacon within a period of time randomly drawn from a uniform distribution over a predefined time interval, until a response to the transmitted beacons is received.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A method for a device to pre-empt data transmissions by another device in a discovery channel, comprising:
   scanning, by the device, the discovery channel to detect at least one data beacon transmitted by the other device in beacon slots of a superframe;
   determining, by the device, if at least one data beacon was detected; and
   transmitting, by the device, a pre-empt beacon if the at least one data beacon was detected;
   wherein the pre-empt beacon informs the other device transmitting data over the discovery channel to vacate the discovery channel from data transmissions.

2. The method of claim 1, further comprising: transmitting, by the device, discovery beacons if the at least one data beacon was not detected.

3. The method of claim 2, wherein the discovery beacons are transmitted using a contention based medium access during a randomized period.

4. The method of claim 1, wherein the scanning of the discovery channel is performed during at least one superframe.

5. The method of claim 1, wherein the at least one data beacon can be transmitted by any type of device operable at least according to an Ecma standard.

6. The method of claim 1, wherein the pre-empt beacon is transmitted during a signaling slot in the superframe, the signaling slot being randomly chosen among a plurality of signaling slots that are indicated by the received data beacon.

7. The method of claim 1, wherein the pre-empt beacon is transmitted during a beacon period announced in the superframe, the beacon period being announced by the received data beacon.

8. The method of claim 7, wherein the pre-empt beacon is transmitted using a medium access used for transmitting beacons during the beacon period announced.

9. The method of claim 1, wherein the pre-empt beacon is transmitted during a command exchange period in a superframe, the command exchange period being announced by the received data beacon.

10. The method of claim 9, wherein the pre-empt beacon is transmitted using a medium access used for transmitting beacons during the command exchange period.

11. A non-transitory computer readable medium having stored thereon computer executable code causing a computer in a device to perform the process of pre-empting data transmissions by another device in a discovery channel, comprising:

scanning, by the device, the discovery channel to detect at least one data beacon transmitted by the other device in beacon slots of a superframe;

determining, by the device, if at least one data beacon was detected; and transmitting, by the device, a pre-empt beacon if the at least one data beacon was detected;

wherein the pre-empt beacon informs the other device transmitting data over the discovery channel to vacate the discovery channel from data transmissions.

12. A device connected in a wireless personal area network (WPAN) and capable of pre-empting data transmissions by another device in a discovery channel, the device comprising:

a receiver for scanning the discovery channel to detect at least one data beacon transmitted by the other device in beacon slots of a superframe;

a processor for determining if at least one data beacon was detected; and a transmitter for transmitting a pre-empt beacon if the at least one data beacon was detected;

wherein the pre-empt beacon informs the other device transmitting data over the discovery channel to vacate the discovery channel from data transmissions.

13. The device of claim 12, wherein the transmitter further transmits discovery beacons if the at least one data beacon was not detected, the discovery beacons being transmitted using a contention based medium access during a randomized period.

14. The device of claim 12, wherein the device is one of a type A device, a type B device, and a type C device, each being operable according at least to an Ecma standard.

* * * * *